United States Patent Office 2,796,532
Patented June 18, 1957

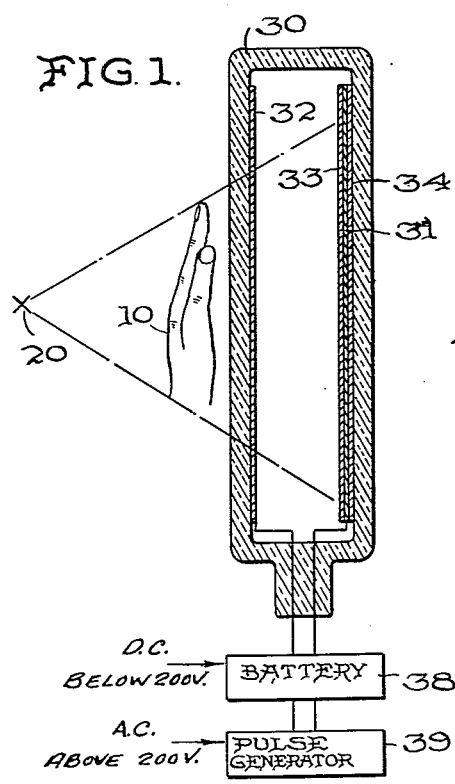
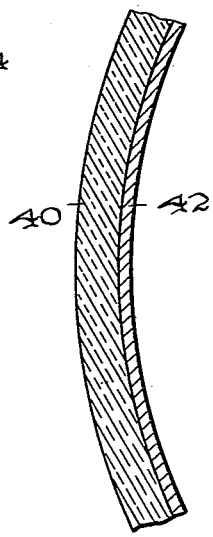
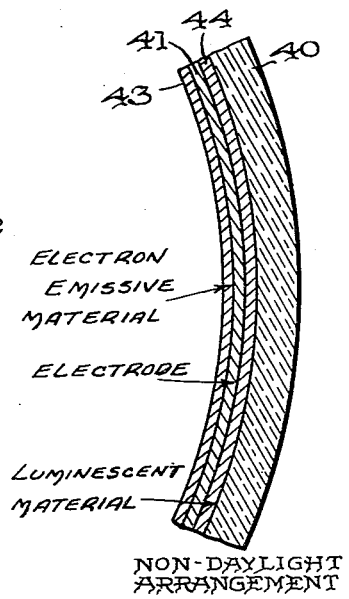
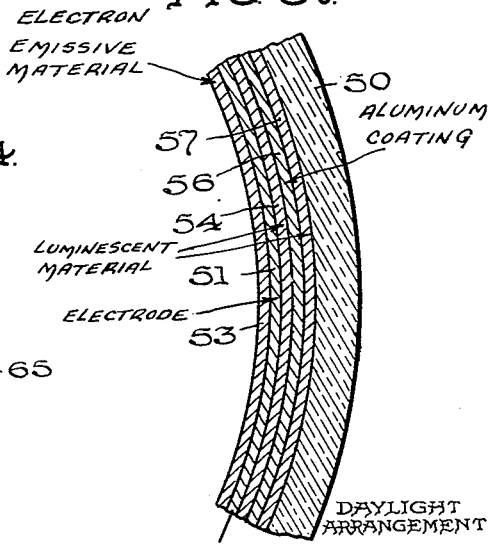
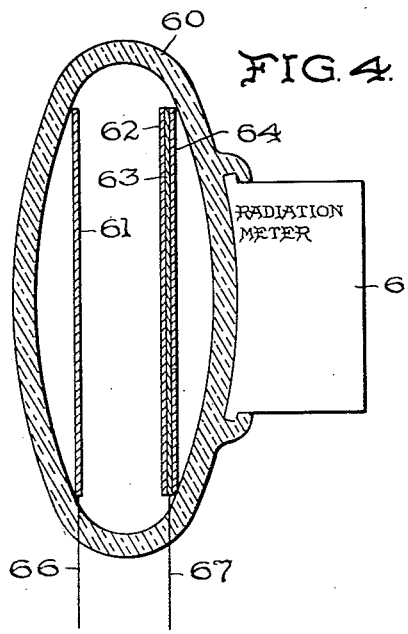

2,796,532

PARALLAX-FREE REFLEX TYPE IMAGE INTENSIFIER

Walter E. Teague, Longview, Tex., and Morris W. Chisholm, Indianapolis, Ind.

Application March 11, 1954, Serial No. 415,506

11 Claims. (Cl. 250—213)

(Granted under Title 35, U. S. Code (1952), sec. 266)

The invention described herein may be manufactured and used by or for the Government for governmental purposes, without payment to us of any royalty thereon.

The invention relates to a parallax-free reflex type image intensifier used in radiant energy shadow image reproduction, and more particularly to a novel method and means for producing a clear and intense visible image from a received beam of radiant energy having a given cross-section pattern.

A large number of radiant energy contrast amplifiers have been proposed in the past. One such type is the X-ray intensifier, another is the light amplifier. These devices are generally used to operate upon a beam of radiant energy in order to raise the transmission power level. The beam usually has a shadow image modulated on its cross-section, or, in other words, the beam generally is not an image of the object field but is an image of the shadows about the object field. The pattern developed by the modulation is a distribution of light and shadow from an object field being illuminated by a source beam upon a given cross-section which is perpendicular to the line of the path of the beam of light from the said object field. In raising the power level of the beam in these amplifiers, provision usually is made for preserving and re-emphasizing the contrast character of the original beam.

- Contrast amplifiers of the prior art use as a general concept a plurality of substantially parallel surfaces to intersect the incident beam. The first surface translates the incident beam into a secondary beam of photons, photoelectrons, or a form of cathode particle or radiation and responsive to the incident beam. The last intersecting surface plate receives the transit particles and because of the high voltage potential applied to the plates, amplification of the contrast value of the primary shadow image is achieved. The impinging particles on the plate react with a luminescent mosaic that translates back from cathode particles or radiation to some form of electromagnetic wave energy such as visible light dependent on the character of the material used.

In medical applications, it is at times advantageous to use low levels of incident energy in that higher levels of the same type of radiation may be deleterious to humans. Such an amplifier of image contrast allows the operator to view the desired image without suffering these harmful effects. Improved healthful results can be obtained by using lower levels of energy in pulsing the incident radiation, using higher particle velocities between the plates by applying a large voltage difference, and using long persistance luminescent mosaics.

Occasions exist as well where the incident beam is of another type of electromagnetic energy such as radio, microwaves, infra-red and visible light. Appropriate materials are available that respond readily to any of the above conditions. However, in all of these contrast amplifiers, it is often found that the incident beam energy is not completely absorbed by the initial plate, but some continues its travel and strikes the last plate constituting the mosaic material. It is generally observed that all of the incident energy travels as though it came from a point of origin while the particles of the cathode emission the usually follow parallel lines from the first plate to the last plate. When the particles follow other patterns, it appears they develop from a point source that is not coincident with that point determined by the incident beam. This creates the illusion of fuzziness on the viewing mosaic and the effect operating under these conditions is called parallax. A feature of the invention is to achieve congruence of the several excited images presented on the mosaic generated by the incident and secondary beams so that an accumulative image is derived from the several beams.

Intensifier arrangements in the prior art have commonly involved the use of a first photo-emissive plate responsive to the in-coming radiation for generating cathode particles that are directed to a luminescent mosaic viewing screen by a D. C. voltage applied between the two plates. Any intensification of the original image is attributed to the velocity of the cathode particles that impinge on the mosaic screens. The magnitude of the velocity of the cathode particles is related directly to the voltage difference impressed on the first plate and the viewing screen. However, a value of voltage is soon reached where it is not practicable to go above, in that the increased voltage causes substantial thermal agitation and emission of electrons additional to those emitted in response to the incoming image signal energy. In other words, there is what might be called a high ratio of image signal to thermal noise in which a contrast image improvement is not developed. One object of the invention is to eliminate substantial noise due to thermal emission of electrons and still achieve an intensified image.

The above application of D. C. voltage potential between the first and screen plates is used to establish an electrostatic field between these parallel plates, whose lines of force are generally pictured as perpendicular to the plates. This field of force serves two functions, one, to accelerate the electrons from the first plate to the screen plate, and second, to establish a path or direction of travel for the said electrons. In practicing this invention the D. C. voltage is used in the manner of the prior art for obtaining a beam of electrons from an emissive plate. The beam of electrons is then, by a reflex action, returned to the emissive plate at a high acceleration. The reflex action is accomplished by applying between the plates a pulse of steep wave-front characteristics. The relationship in derivative form of the potential F applied to the plates of the value of acceleration $a$ of the electrons, where the mass $m$ of the particle is considered to be constant and where $t$ is the time for the electrons to traverse the reflex path and impinge upon the emissive and luminescent material in the plate is, $$\frac{dF}{dt} = m\frac{da}{dt}$$

The energy E developed in the plate of emissive and luminescent material is given by the relation $$E = \tfrac{1}{2} m v^2$$

where $v$ is the velocity of the particle at the time of impingement.

From the above development it is apparent that intensification is quite dependent on the impact velocity of the electrons as they impinge upon the mosaic screen.

In the design of contrast amplifiers having a screen presenting a visible image, it is often important to know how the ability of the eye to distinguish between two points of slightly different brightness varies with their average brightness. The ability of the eye to distinguish between two point sources of nearly equal brightness is called contrast sensitivity or intensity discrimination. If the eye can just distinguish an object whose brightness differs by an amount dB from a large field of brightness B, the contrast sensitivity may be measured by $$\frac{dB}{B}$$

sometimes called Fechner's fraction. The contrast sensitivity will, of course, vary inversely with this value. It is a purpose of the invention to develop a useable image from a deficient image by increasing the value of intensity discrimination.

Broadly, in accordance with the invention, a single plate is used both to emit and then receive these accelerated cathode particles in such a manner that no aberration, parallax, thermionic noise or other disadvantageous features are present. Electrons are allowed to be emitted from the single plate in a direction opposite to that of the incident radiation and are collected by a collector electrode. Low voltage is used on the collector electrode to eliminate the effect of thermionic noise. At predetermined times pulses having steep wave fronts are applied between the collector and single electrodes so that electrons that have not been collected by the collector electrode are shot back to the single electrode at such a velocity that the luminous mosaic situated on the viewing side of the single electrode yields an intensified version of the original image.

Any type of radiant energy may be applied to the apparatus of the invention, for example, radio, microwave, infra-red, visible light, ultra violet, X-ray, gamma, and cosmic rays or waves, etc. Of course, the apparatus must be properly adapted and designed to function on the various forms in the spectra of electromagnetic energy.

Various types of mosaic screens can be used as are known in the art, to provide visible, infra-red ultra-violet or other type of image.

Other objects and features of the invention will in part be pointed out, and in part be evident, in the discussion of the specific embodiments given hereinafter.

The invention will be more fully understood by reference to the following description of specific embodiments thereof, taken in conjunction with the drawings in which:

Fig. 1 is a cross-sectional view and circuit diagram illustrating one embodiment of the invention;

Fig. 2 is a cross-sectional view illustrating a modification of the arrangement of the first electrode of Fig. 1;

Figs. 3a and 3b are cross-sectional views illustrating a modification of the arrangement of the second electrode of Fig. 1; and Fig. 4 is a cross-sectional view showing another modification of the arrangement of Fig. 1.

Referring now to Fig. 1, object field 10 is positioned to cause intensity modulation of a beam of radiant energy derived from a source 20 of electromagnetic energy. The type of energy developed in source 20 may be of any type of electromagnetic energy, such as, radio waves, micro-wave energy, infra-red waves, visible light waves, ultra-violet waves, X-rays, gamma rays, cosmic waves, etc., or any portion of the spectrum that intervenes this display of spectrum. A shadow image or pattern of the object field 10 is projected in line from source 20 through an envelope 30 upon an electron emissive electrode 31 in an envelope 30. The electron emissive electrode is made of a material that is emissive in response to the incoming modulated beam. The emissive action is often considered as photo-emission, photo-electric effect, cathode particle emission, photon emission, photo-electron emission and by other equivalent terms. Envelope 30 may be composed of one of various materials such as glass, or other transparent materials used in making high vacuum envelopes. Combination of glass or other transparent materials and metal may be used so that certain sections of the envelope may be opaque to the undesired reception of predetermined types of electromagnetic energy.

An electrode 32 is also located within the envelope 30 and is so positioned that it is between the object field 10 and the emissive electrode 31. Electrode 32 is made of a conductive coating of any substance that is readily transparent to the incoming beam from the source 20 of electromagnetic energy. A suitable transparent conductor is manufactured by the Pittsburgh Plate Glass Company and is identified by the trade-name of "Nesa." Other types of transparent material are vacuum-settled coating of aluminum, silver or gold. A thin aluminum sheet may be used where X-ray or gamma radiation is used as a beam source. A suitable conductive transparent plastic electrode may be used.

The electron emissive material 33 may be a composition that emits electrons under the action of incident radiation; the number of the electrons emitted is responsive to the magnitude of the incoming beam. Examples of such materials are any of the alkali metals, bismuth, germanium or antimony treated with a trace of cesium. Other materials that are significantly emissive also may be used, such as, slightly oxidized silver, copper, rhenium, manganese, aluminum, certain forms of barium or their compounds, or ruthenium.

As a backing to electrode 31 there is a lamination 34 of radiant energy sensitive or luminescent coating that is activated by predetermined types of incident energy derived from source 20 and also activated by any electrons that are caused to impinge upon it. The luminescent lamination 34 may be of such materials as calcium oxide activated with antimony oxide mixed in such proportions as 100 parts to 1 part; calcium oxide activated with one of the oxides of the rare earth metals such as dysprosium oxide, europium oxide, and neodymium oxide; and calcium phosphate activated with a manganese compound, such as manganese sulphate. Various compounds or solid solutions of copper, strontium, aluminum, silicon, arsenic, molybdenum and manganese can also be used.

Luminescent lamination 34, which also may appear as a cathode-luminescent coating, may be positioned upon the inside wall of the envelope 30, or may be spatially separated from the envelope wall. The image developed by the cathode-luminescent lamination 34 is directly viewable through the envelope and may be used for any load device such as an input to a television transmitter, an input to a light or radiation meter, or other devices well-known in the art.

The operation of the invention shown in Fig. 1 is on well established principles in the electron art. A beam of energy is developed in a source 20 and a portion passes onto an object field 10. From the field 10 there is developed a shadow image. The amplitude of the energy beam as received by the tube or envelope 30 may be so low, that it is not ordinarily useable. The source 20 may or may not be pulsed into on and off conditions.

The beam as received by the tube or envelope 30 passes through the first electrode 32 and impinges laminations 31, 33, and 34. This primary beam strikes electron emission material 33 and releases electrons from its surface which are drawn toward and collected by the first electrode 32. One arrangement that is used to attract the electrons initially toward electrode 32 is to use a positive D. C. bias applied to electrode 32. The electrons that travel toward electrode 32 are of a low velocity in that a voltage of approximately 200 v. is applied. While there are some electrons not yet received by electrode 32, a negative voltage pulse from generator 39 is applied in the form of a steep wave front to electrode 32 in order to drive back the electrons toward the emissive material 31 and the cathode-luminescent material 34 at an increased velocity. The amplitude of the pulses are in the order of 10 to 40 kv. The acceleration developed in the electron particles is used to establish a high degree of luminescence in the luminescent material 34, not otherwise achieved without acceleration of electrons to a significant value of velocity The image formed by the accelerated impinging electrons is exactly congruent to the image, if any, developed by the received beam which may be of the necessary strength to bring the luminescent material 34 to excitation.

In the above method of practicing the invention a normally-on conductive path of slow electrons is first maintained and thereafter the electron flow is interrupted by applying a steep negative pulse to electrode 32 which also establishes a reflex action in that the pulse brings the electrons back to emitter electrode 31.

Another arrangement may be devised whereby the flow of slow electrons is normally in an off-condition until positive marker pulses are applied to electrode 32. Then electrons flow toward electrode 32 until the pulse recedes, at which time the electrons which are not yet received, fly back to electrode 31 and excite the luminescent material 34 in the same manner.

Fig. 2 shows a modified arrangement of the electrode 42 that is at least transparent for the desired type of radiant energy. In this form of the invention, greater strength in the envelope structure is afforded by making the surface of the envelope 40 outwardly convex.

In Fig. 3a there is shown a modified arrangement of the cathode-luminescent material 44 supported by the inside wall of the envelope 40. Here as in Fig. 2, the surface of the envelope 40 is outwardly convex to impart greater strength to the envelope.

A modified arrangement of the intensity beam amplifier for use in daylight is shown in Fig. 3b. Electrode plate 51 is the plate for electrons emitted from electron emissive material 53. The electrode 51 may be partially transparent to the incident radiation. Electron emissive material 53 and cathode-luminescent material 54 are laminated on each side of electrode 51 as shown. Next to the luminescent lamination material 54 there is a layer of aluminum or an aluminum coating 56 deposited in vacuo from the vaporous state, to serve the function of blocking any incoming light that otherwise might enter through the luminescent material 57 on the inside surface of the envelope. Luminescent materials 54 and 57 may be of the same type of cathode-luminescent material as the cathode-luminescent material 34 used in the embodiment shown in Fig. 1; preferably it is desirable to use the same type of cathode-luminescent material as that used in layer 34 of Fig. 1 and in lamination 57, and a different type of cathode-luminescent material in lamination 54, especially when X-rays are used as the incoming radiant energy. Such X-ray-sensitive coating or luminescent materials may be calcium tungstate, any tungstate with a trace of lead, a zinc orthosilicate activated with manganese, whether it be alpha or beta-orthosilicate, a zinc sulphide type lamination, or a zinc tungstate coating. It should be noted here that if electrode plate 51 be composed of antimony treated with cesium and if electrode 53 be composed of a tungstate compound, an isolation or protection layer such as silver, gold or silicate should be positioned between elements 51 and 53 to eliminate any adverse effects of the tungstate material.

Fig. 4 shows the use of a contrast amplifier used as a radiation detector. Within envelope 60 there is a substantially transparent electrode 61 for incoming energy, a receiver electrode 63 for the incoming beam, an electron-emissive material 62 that emits electrons in response to the incoming beam in both directions, but primarily in the direction of the electrode 61. The emission of electrons from the material 62 toward electrode 61 is caused by the positive voltage applied on it. The pulses are so applied between conductors 66 and 67 that those electrons emitted from material 62 and not yet received by electrode 61, are thereupon shot back to material layer 62 and electrode 63 at a high velocity. This increased velocity is essential in creating a contrasting image on the luminescent screen 64. The high velocity particles are used to excite the luminescent screen 64 to a higher degree of brightness and contrast than otherwise would be possible by the ordinary incidence of a radiant energy beam on a luminescent mosaic.

The amplified value of contrast developed by the parallax-free, reflex type image intensifier of the invention may be used to actuate a light or radiation meter. Thus, small amounts of radiation present in a given area may be determined by this type of radiation detector device.

The scintillation counter is an example of the type of radiation meter which may be used in Fig. 4. Such counters are imporant in the field of radiac. The scintillation type counter is similar in use to the Geiger-Mueller counter, as both are used for low intensity gamma detection. The scintillation type counter is a light sensitive device such as a high-gain photomultiplier tube that actuates a meter or earphone. Since the photomultiplier tube is light-sensitive, the tube and the intensifier must be encased in a light-tight envelope.

The arrangement in Fig. 4 may operate in accordance with the invention as a radiation meter without having the incoming beam modulated by any image. The electrodes 61 and 62 would be used to develop an electron beam that is more intense than the incoming beam. The accelerating eletron beam may be used either to excite a luminescent screen 64 which in turn produces a light source for a photomultiplier in the radiation meter 65, or to excite the electron emissive material which functions as a source of electrons for an electron multiplier that is housed in the radiation meter 65. In such an arrangement the luminescent material 64 may be omitted if it is desirable to develop no visible view of the incoming beam. Suitable means that functions similar to electrode 61 and the pulsing source applied thereto, may be disposed between the electrode 63 and the radiation meter 65 in order that the secondary electrons that are released in the material may be drawn toward and into the electron multiplier.

In any of the above embodiments shown, the first or transparent electrode of the tube device which the incoming radiation encounters before passing to the emissive electrode may be deleted from the apparatus and the system completely if it is replaced by an electromagnetic equivalent. Such equivalent may be in the form of a coil placed about the tube structure in such a way that upon energization the electrons are caused to function in the manner disclosed with the electrostatic field plate.

Although the figures of the drawing disclose that the electron emissive-luminescent electrode is constructed in laminations of appropriate material, it is also possible to practice the invention by using the same materials in aggregate form so that the electrode forms a single layer or plate.

Many additional modifications and variations will occur to those skilled in the art and in suitable cases certain features of the invention may be employed while omitting other features.

We claim:

1. Apparatus for producing intensity discrimination on a luminescent screen of an object projected thereon by an electromagnetic energy beam comprising an envelope transparent to electromagnetic radiation, electron attracting means mounted within said envelope, pulsed energy means for instantaneously increasing the potential applied to said electron attracting means above a predetermined constant potential value, a second electrode mounted in mutually spaced relation to said electron attracting means and including electron emitting and luminescent material responsive to electromagnetic radiation for initiating electron flow between said electron attracting means and said second electrode, said pulsed energy being applied to said electron attracting means to reverse the direction of electron flow prior to impingement on said electron attracting means and impart increased energy to the reversed electrons to excite said luminescent coating upon impingement thereon thereby producing an intensified shadow image of an object on said luminescent material.

2. Apparatus for developing intensified shadow images on a pattern of radiant energy comprising mutually spaced first and second electrodes located within an evacuated envelope, said envelope and said first electrode being transparent to radiant energy, said second electrode including a laminated structure of electron emitting material and a luminescent mosiac cooperating to produce a primary shadow image on said luminescent material when activated by radiant energy, constant electric potential means connected between said first and second electrodes for attracting to said first electrode electrons emitted from said second electrode emissive coating, electric energy pulsing means connected in parallel with said constant potential means effective to cause emitted electrons to be returned to said second electrode to generate upon said luminescent mosaic a secondary shadow image congruent with said primary image thereby producing an intensified shadow image.

3. Apparatus for producing intensity discrimination on a luminescent screen of an object projected thereon by an electromagnetic energy beam comprising a control electrode, a second electrode in spaced relation to said control electrode including laminated electron emitting material and luminescent material responsive to electromagnetic radiation, an evacuated envelope transparent to electromagnetic radiation enclosing said electrodes, a unidirectional energy source and a pulsed energy source connected in parallel between said electrodes for instantaneously increasing the potential applied to said control electrode at predetermined intervals whereby electrons attracted toward said control electrode from said electron emitting material are reversed in direction and increased in velocity at predetermined intervals corresponding to said pulsed energy intervals for impingement on said luminescent material to produce intensified shadow images of an object on said luminescent material.

4. Apparatus for producing intensity discrimination on a luminescent screen of an object projected thereon by an electromagnetic energy beam comprising a first electrode including laminations of electron emissive material and luminescent material responsive to electromagnetic radiation, a second electrode, said first and second electrodes enclosed in an evacuated envelope transparent to electromagnetic radiation, a source of unidirectional energy and a pulsed energizing source connected in parallel between said first and second electrodes to establish an electrostatic field between said first and second electrodes to attract electrons released by electromagnetic energy activation of said emissive material and at predetermined intervals reversing the direction of travel and increasing the velocity of the emitted electrons whereby said electrons impinge said luminescent coating to produce intensified shadow images of an object on said luminescent material.

5. Apparatus for increasing the contrast of an object projected by radiant energy on a luminescent screen comprising mutually spaced first and second electrodes enclosed in an envelope, constant potential means connected between said electrodes to establish an electrostatic field therebetween, said first electrode and said envelope being transparent to radiant energy, a photosensitive material and a luminescent material coated on opposite parallel sides, respectively, of said second electrode, said photosensitive material being in face relation with said first electrode and emitting electrons when activated by radiant energy, said luminescent material being adjacent a wall of said envelope opposite said first electrode, pulsed energy means connected in parallel with said constant potential means and of greater magnitude than said constant potential means for producing at predetermined intervals an electrostatic field to produce a force on electrons emitted by said photosensitive material opposite that produced by the electrostatic field created by said constant potential means whereby the direction of travel of emitted electrons is reversed and their velocity increased to impinge said luminescent material producing an intensified congruent shadow image of a projected object on said luminescent material.

6. Apparatus as recited in claim 5 wherein said envelope is rectangular in cross section and said first and second electrodes are parallely arranged, each of the longer walls of said envelope contacting on an inner surface thereof said first electrode and said luminescent material, respectively.

7. Apparatus as recited in claim 5 wherein a pair of opposite walls of said envelope are curved outwardly, said first and second electrodes being similarly curved, each of said outwardly curved walls contacting on an inner surface thereof said first electrode and said luminescent material, respectively.

8. Apparatus for measuring electromagnetic radiation comprising an electron attracting element transparent to electromagnetic radiation and an electrode including electron emitting and luminescent material responsive to electromagnetic radiation coated thereon, an envelope transparent to electromagnetic radiation enclosing said element and said electrode in mutually spaced relation, constant potential means connected between said element and said electrode to establish an electrostatic field of predetermined magnitude between said element and said electrode for attracting electrons released by said electron emitting material, pulsed energy means connected in parallel with said constant potential means for instantaneously applying a potential in excess of the constant potential effective to reverse the direction of travel of emitted electrons and increase their velocity to penetrate said electron emitting material and said electrode and impinge upon said luminescent material for activation thereof, means mounted externally of said envelope in registering relation with said luminescent material responsive to radiation emitted by said luminescent material for detecting electromagnetic radiation initiating activation of said luminescent material.

9. Apparatus as recited in claim 8 wherein said envelope is elliptical in cross section and said element and said electrode are mounted parallel to the major axis thereof.

10. Apparatus for increasing the contrast of an object projected by radiant energy on a luminescent screen comprising mutually spaced first and second electrodes enclosed in an envelope, constant potential means connected between said electrodes to establish an electrostatic field therebetween, said first electrode and said envelope being transparent to radiant energy, a photosensitive material and a first layer of luminescent material coated on opposite parallel sides respectively of said second electrode, said photosensitive material being in face relation with said first electrode and emitting electrons when activated by radiant energy, means opaque to radiation emanating externally of said envelope to prevent activation of said luminescent material coated on said second electrode, and a second layer of luminescent material contacting on opposite sides thereof said opaque means and an inner surface of said envelope, pulsed energy means connected in parallel with said constant potential means and of greater magnitude than said constant potential means for producing at predetermined intervals an electrostatic field to produce a force on electrons emitted by said photosensitive material opposite that produced by said constant potential means whereby the direction of travel of emitted electrons is reversed and their velocity increased to impinge said first and second layers of luminescent material producing an intensified shadow image of a projected object on said luminescent layers.

11. Apparatus as recited in claim 10 wherein a metallic layer constitutes said opaque means.

References Cited in the file of this patent

UNITED STATES PATENTS

| | | |
|---|---|---|
| 2,177,360 | Busse | Oct. 24, 1939 |
| 2,594,740 | De Forest et al. | Apr. 29, 1952 |
| 2,603,757 | Sheldon | July 15, 1952 |
| 2,605,335 | Greenwood et al. | July 29, 1952 |
| 2,666,864 | Longini | Jan. 19, 1954 |